No. 725,937. PATENTED APR. 21, 1903.
D. CRAIG.
PRESSURE RESISTING SEAL.
APPLICATION FILED OCT. , 1901.
NO MODEL.
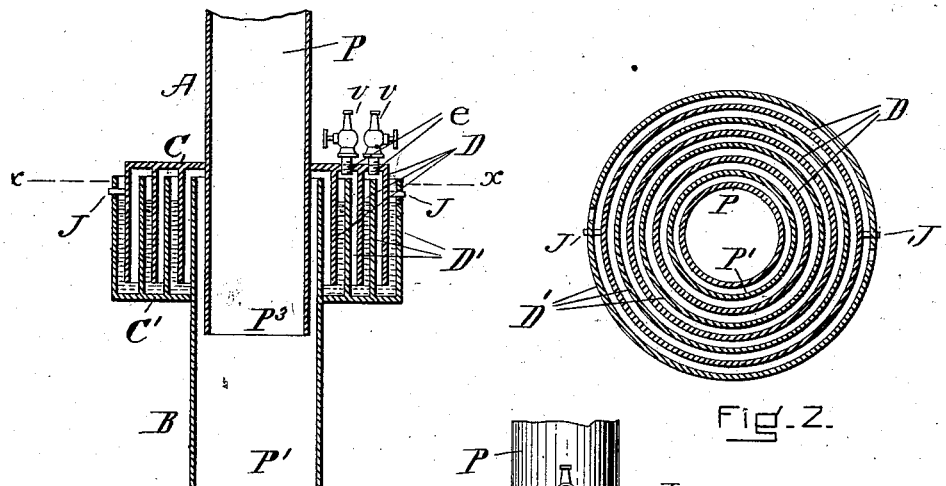
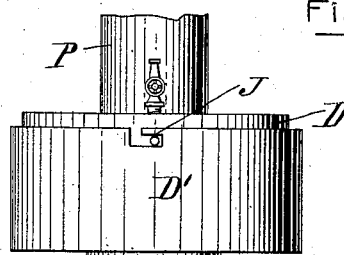
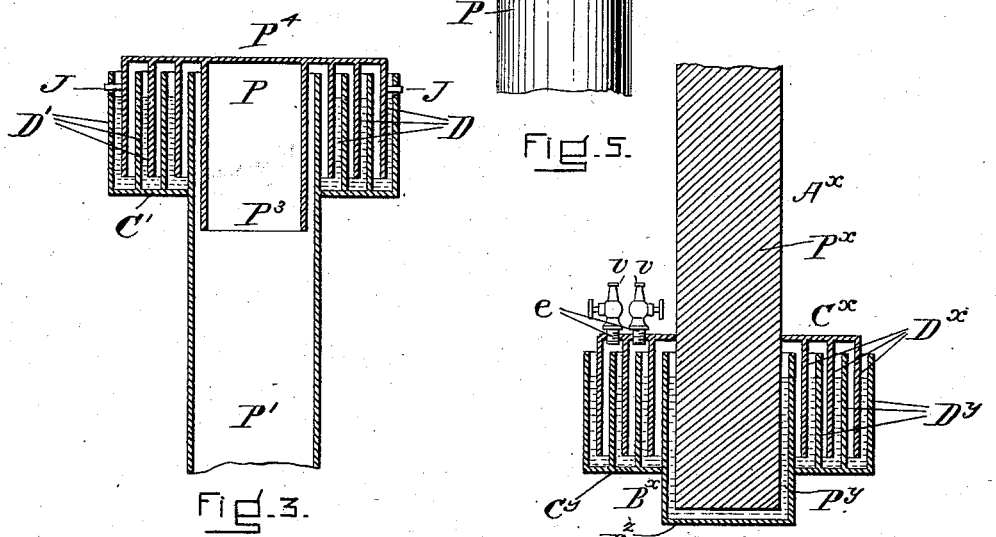
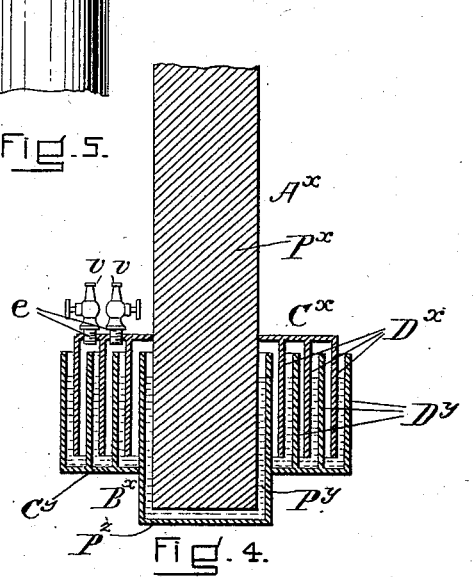
WITNESSES:
Frank S. Hartnett
Mary M. Danaher
INVENTOR:
David Craig,
By Roberts & Cushman
his attorneys.

UNITED STATES PATENT OFFICE.

DAVID CRAIG, OF MELROSE, MASSACHUSETTS.

PRESSURE-RESISTING SEAL.

SPECIFICATION forming part of Letters Patent No. 725,937, dated April 21, 1903.

Application filed October 26, 1901. Serial No. 80,029. (No model.)

*To all whom it may concern:*

Be it known that I, DAVID CRAIG, a citizen of the United States, residing at Melrose, in the county of Middlesex and State of Massachusetts, have invented new and useful Improvements in Pressure-Resisting Seals, of which the following is a specification.

My invention relates to pressure-resisting seals; and its object is to provide a union or joint for coupling two pipes together which shall constitute an absolute seal incapable of leakage within given pressures.

A further object of my invention is to provide a plug or cap for closing the end of a pipe which also shall constitute an absolute seal.

A further object of my invention is to provide a pivot-bearing by an adaptation of the same invention capable of sustaining a heavy load with the least possible friction.

My invention and improvements are an application of the principle of hydraulics that a duct leading in ascending and descending convolutions from any point in a vessel or receptacle containing a liquid will maintain a head of said liquid in the receptacle above the opening into said duct equivalent to the sum of the vertical heights of the ascending legs of said duct, provided the ascending passages of the ducts are filled with the liquid, while a column of air is sealed within each of the descending passages of the ducts, or will maintain a pressure equivalent to that exerted by such head of liquid.

My invention is illustrated in the accompanying drawings, in which—

Figure 1 shows in vertical longitudinal section a pipe union or joint embodying my invention. Fig. 2 is a horizontal cross-section of Fig. 1, taken through the line $xx$. Fig. 3 is a vertical longitudinal section of a pipe and plug or cap embodying my invention. Fig. 4 is a vertical longitudinal section of a pivot-bearing embodying said invention, and Fig. 5 is a side elevation of the pipe-union illustrated in Figs. 1 and 2.

Like parts in all the figures are indicated by the same letters of reference.

Addressing my description first to the invention when employed as a pipe union, joint, or coupling, as illustrated in Figs. 1, 2, and 5, A is the upper member of the union and B the lower member. P and P' represent lengths of pipe to be joined together. One of these pipes, preferably the pipe P of the upper member, is smaller than the other pipe and is adapted to telescope the latter when the union is effected. Said pipes are surrounded near their ends by collars C and C', respectively. Extending from the collars C and C' in the directions of the ends of the pipes are the series of concentric tubular walls D and D'. In the lower member B these walls D' are preferably of equal height and of the same height as the end of the pipe P'. In the upper member A the pipe P preferably extends a little beyond the ends of the walls D, as at $P^3$, to assist in centering the two members of the union when they are placed together. The collar C and tubular walls D and the corresponding parts C' and D' in the lower member each form a series or nest of concentric cups of graded sizes, the walls of the cups of one member being proportioned so as to mesh with the hollows of the cups of the other member, as shown. Any suitable locking device, as the bayonet-joint J, may be employed to secure the two members of the union together. It will be seen that the two series of nests of cups meshed with each other form a duct leading from the crevice or interstice or space between the pipes P and P' in ascending and descending convolutions. The height and number of these convolutions may be varied at pleasure, according to the pressure which the joint is intended to withstand, by varying the length and number of the tubular walls D and D'. The seal formed by a liquid within the upward passages of these convolutions, a column of air being confined in the downward passages, will maintain a head of liquid in pipe P equivalent to the sums of the heights of the ascending passages between the walls D and D'. Each of said members may be cast in one piece, or the collars C and C' and concentric walls D and D' may be soldered or fused on or otherwise secured, so as to render the cups formed thereby air-tight.

I will now describe the operation of my invention when applied to a sanitary fixture, as a joint, inasmuch as such use is sufficiently characteristic to illustrate the principle of my invention. Referring to Fig. 1, suppose the pipe P to lead from a bowl and the pipe P' to be the drain-pipe supplied with a trap adapted to maintain the water at a given height in pipe P. Water is then admitted into the pipe P. When it rises to the height of the end of pipe P', it will trickle into the innermost cup between P' and the inner of the tubular walls D'. When the liquid in this cup rises to the height of the lower end of the downwardly-projecting innermost tubular wall D, it will form a seal, a column of air being confined in the first downward passage. As the hydraulic head in pipe P is raised, the liquid will continue to overflow the end of pipe P'; but owing to the column of air sealed within the innermost downward passage the liquid will not fill the same, but will mount the next outer ascending passage, and the column of liquid therein will maintain a hydraulic head in pipe P above the end of pipe P' equivalent to the height of said column of liquid, and so on of the remaining convoluted passages. The liquid is shown in the drawing in the position it will occupy when the joint or coupling is completed and operating as above described.

The foregoing description of the operation applies when the two members are put together dry, and the seal is formed as the pressure of liquid in the pipes gradually increases. If the seal is to be ready formed, as is desirable when a sealing medium of greater specific gravity than the liquid in the pipe is to be used or when my invention is to be used as a pivot-bearing, as in Fig. 4, presently to be described, the cups of the lower member should be about half filled with the sealing liquid. The upper member is then set into the lower member, the air being allowed to escape from the upper cups through the valves $v$, which are afterward closed. When the pressure is raised within the joint, the air in the innermost upward passage—i. e., between pipes P and P'—will be forced over into the first descending passage, the liquid in the first descending passage will be forced into the next ascending passage, and so on. It will be seen that the seal will sustain a pressure equivalent to the sum of the heads in all the ascending passages.

When the passages are filled, as first above described, by a liquid from within the pipe, the increasing volume or capacity of the ascending and descending passages from the center to the periphery of the nest of cups, in case the passages are all of the same width, need not be taken into account, for the reason that sufficient liquid will be supplied from within the pipe to fill the outer upward passages of larger capacity, air being sealed within the successive downward passages as the above-described operation progresses. When, however, the seal is formed not by a liquid from within the pipe, but by placing the sealing liquid in the cups of the lower member before putting the two members together, in order to derive the advantages of my invention to the fullest extent the successive passages from the inner to the outer ones may be progressively narrowed a little to compensate for their increasing diameters, thus keeping the volumes or capacities of all the passages equal; otherwise if the passages are all of the same width and so of progressively-increasing volumes the displacement of a given volume of liquid in the innermost passage when pressure is applied will create a constantly-decreasing hydraulic head in each successive ascending outer passage, which, while employing the advantages of my invention in a degree, would not utilize the pressure-resisting capacities of the full heights of the ascending passages.

My said union or joint is adapted for use as a gas, liquid, or drain pipe, and is especially useful for the latter purpose. A sanitary fixture of this nature having a joint which is dependent upon gaskets, putty, and the like is constantly liable to leakage, whereas my improved joint constitutes an absolute seal for a given head of liquid in pipe P. Furthermore, it affords economy of time and labor in installing it over the old forms of sanitary joints, since it simply requires the upper member to be set into the lower member, whereupon the joint will be complete.

Referring now to the modification of my invention, whereby it is used as a plug or cap for a pipe, as shown in Fig. 3, the foregoing description is applicable in all respects, except that one of the pipes, as P, instead of serving as a pipe connection is closed, as at $P^4$. The upper member A then becomes a cap or plug and the capacity of the seal to resist pressure in the pipe P depends upon the principles already described.

Fig. 4 illustrates another modification of my invention embodied in a pivot-bearing. The upper or pivot member $A^x$ comprises the shaft $P^x$, which is either solid or, if hollow, has a closed end and the concentric cups formed by the parts $C^x$ and $D^x$, as heretofore described. The lower or bearing member $B^x$ is the same as the lower member B of the pipe-union above described, except that the inner tube $P^y$ instead of being an open pipe like P' in Figs. 1 and 3 is closed, as at $P^z$. $C^x$ and $C^y$ are the collars surrounding the parts $P^x$ and $P^y$, respectively, and correspond to the collars C and C' in Figs. 1 and 3. The cups of the lower or bearing member contain a liquid for the purpose of sealing the air-space within the cups and lubricating the members. Any liquid may be used; but the higher the specific gravity of the liquid the greater the load which may be borne by the upper or pivot member. The central cup of the lower member is preferably made deeper than the rest, and the shaft $P^x$ of the upper member extends beyond the openings of its surrounding cups into the said central cup of the lower member. So long as the load upon $P^x$ is not sufficient to force the liquid out of the bearing-cups the upper member will be supported on an air-cushion, whereby the friction will be reduced to a minimum. By employing a large number of cups and deep walls $D^x D^y$ and a heavy liquid, such as mercury, for a sealing medium excessive loads may be borne by the pivot member. My said pivot-joint is suitable for derricks, ordnance, and like heavy apparatus. In the same manner it will be seen that by using a heavy sealing medium in the pipe-joint shown in Fig. 1 or the pipe-plug shown in Fig. 3 fewer and shorter walls D and D' will be required to maintain a given pressure of the lighter fluid in the pipe than when the liquid contained in the pipe is to serve as a sealing fluid. When the liquid contained in the pipe is relied upon to seal the duct, the two members of the joint may be put together dry—that is, the cups of the lower member need contain no fluid—and the air will escape through the ends of the duct. The fluid will then find its own way into the duct when the pipe is filled and the pressure applied. When, however, a heavier liquid or any liquid other than that contained in the pipe is to be used as a sealing medium, it is put into the cups of the lower member before the two members are placed together, as already described, said cups being about half filled. Consequently I provide an escape for the air contained in the inverted cups of the upper member, which may consist of pipes $e$, leading out of said upper inverted cups. Valves $v$ permit the air to escape when the two members A and B are put together and are closed after the union is made.

What I claim, and desire to secure by Letters Patent, is—

1. A pipe union or plug comprising an upper member and a lower member, said members being adjacent and having an interstice between them, and a seal for said interstice comprising a duct consisting of a series of ascending and descending convolutions leading from said interstice, substantially as described.

2. A pipe union or plug comprising an upper member and a lower member, said members being adjacent and having an interstice between them, and a seal for said interstice consisting of an ascending and descending duct leading from said interstice and formed by a series or nest of concentric cups integral with or secured to each member, the walls of the cups of one member being meshed with walls of the cups of the other member, substantially as described.

3. A pipe union or plug comprising an upper member and a lower member said members being adjacent and having an interstice between them, and a seal for said interstice consisting of an ascending and descending duct leading from said interstice and formed by a series or nest of concentric cups integral with or secured to each member, the walls of the cups of one member being meshed with the walls of the cups of the other member, and means for locking the said members together, substantially as described.

4. A pipe union or plug comprising an upper and a lower tubular member of different sizes, one member projecting within the other, and each member being provided at or near its end with a collar having a series or nest of concentric walls projecting therefrom and surrounding said tubular member, the said series of walls of one member being meshed with the walls of the other member, substantially as described.

5. A pipe union or plug comprising an upper and a lower tubular member of different sizes, one member projecting within the other, and each member being provided at or near its end with a collar having a series or nest of concentric walls projecting therefrom and surrounding said tubular member, the said series of walls of one member being meshed with the walls of the other member, and the smaller or inner tubular member extending beyond its surrounding nest of walls, substantially as described.

6. A pipe union or plug comprising an upper and a lower tubular member of different sizes, one member projecting within the other, and each member being provided at or near its end with a collar having a series or nest of concentric walls projecting therefrom and surrounding said tubular member, the said series of walls of one member being meshed with the walls of the other member, and a bayonet-joint or other suitable lock for securing said members together, substantially as described.

7. A pipe union or plug comprising an upper and a lower pipe member having adjacent ends, one pipe being smaller than and projecting into the other, each member being provided a short distance from its end with a collar from which extend in the direction of the end of the pipe member a plurality of tubular walls of different sizes and of substantially equal height concentric with the pipe member, the tubular walls of one member being meshed with the tubular walls of the other member, and the smaller inner pipe end extending beyond its nest or series of walls, substantially as described.

8. A pipe union or plug comprising an upper and a lower pipe member having adjacent ends, one being smaller than and projecting into the other, each member being provided a short distance from its end with a collar from which extend in the direction of the end of the pipe member a plurality of tubular walls of different sizes and of substantially equal height concentric with the pipe member, the tubular walls of one member being meshed with the tubular walls of the other member, and the smaller inner pipe end extending beyond its nest or series of walls, said members being secured together by a bayonet-joint, substantially as described.

9. A pipe union or plug comprising an upper and a lower member, the lower member consisting of a pipe surrounded by a series or nest of concentric cups containing a sealing fluid, and the upper member consisting of a pipe surrounded by a series or nest of concentric inverted cups, meshed with the cups of the lower member, the upper inverted cups being provided with escapes for air, substantially as described.

10. A pressure-resisting seal comprising an upper and a lower member having oppositely-disposed adjacent ends, the lower member having a series of concentric cups containing a sealing fluid and the upper member having a series of inverted concentric cups, meshed with the cups of the lower member, substantially as described.

11. A pressure-resisting seal comprising an upper and a lower member having oppositely-disposed adjacent ends, the lower member having a series of concentric cups containing a sealing fluid and the upper member having a series of inverted concentric cups, meshed with the cups of the lower member, said inverted cups being provided with escapes for air, substantially as described.

Signed by me at Boston, Massachusetts, this 21st day of October, 1901.

DAVID CRAIG.

Witnesses:
ROBERT CUSHMAN,
FRANK S. HARTNETT.